United States Patent
Hayes et al.

(10) Patent No.: US 7,748,098 B2
(45) Date of Patent: Jul. 6, 2010

(54) METHOD OF TESTING A SEAL

(75) Inventors: Joseph P. Hayes, Williamstown, NJ (US); Carl B. Schartner, Wallingford, PA (US); William D. Brennan, New Castle, DE (US)

(73) Assignee: IntraPac (Swedesboro) Inc., Swedesboro, NJ (US)

(*) Notice: Subject to any disclaimer, the term of this patent is extended or adjusted under 35 U.S.C. 154(b) by 929 days.

(21) Appl. No.: 11/323,518

(22) Filed: Dec. 29, 2005

(65) Prior Publication Data

US 2007/0151086 A1   Jul. 5, 2007

(51) Int. Cl.
*B23Q 17/00* (2006.01)
*G01M 19/00* (2006.01)

(52) U.S. Cl. .................. 29/407.08; 156/64; 156/69; 73/45.5; 73/49.3; 73/52

(58) Field of Classification Search ............. 29/407.01, 29/407.08; 156/64, 69; 73/45.4, 49.3, 52
See application file for complete search history.

(56) References Cited

U.S. PATENT DOCUMENTS

| | | | | |
|---|---|---|---|---|
| 3,302,449 | A | * | 2/1967 | Roberts .................. 73/40.7 |
| 4,213,329 | A | * | 7/1980 | Raymond et al. .............. 73/52 |
| 4,938,818 | A | * | 7/1990 | Dzedzej et al. ............... 156/69 |
| 5,209,795 | A | * | 5/1993 | DeRosa et al. ............... 156/69 |
| 5,333,492 | A | * | 8/1994 | Aarts .................... 73/49.3 |
| 5,340,421 | A |   | 8/1994 | Shea et al. |
| 5,675,074 | A | * | 10/1997 | Melvin, II ................. 73/52 |
| 5,918,270 | A | * | 6/1999 | Heuft ................... 73/45.4 |
| 6,427,524 | B1 | * | 8/2002 | Raspante et al. ............ 73/45.4 |
| 6,430,991 | B1 | * | 8/2002 | Heuft ....................... 73/52 |
| 2004/0154382 | A1 | * | 8/2004 | Chevalier et al. ............ 73/49.3 |
| 2007/0056355 | A1 | * | 3/2007 | Lehmann ................. 73/49.3 |

* cited by examiner

*Primary Examiner*—David P Bryant
*Assistant Examiner*—Christopher M Koehler
(74) *Attorney, Agent, or Firm*—Eugene Chovanes

(57) ABSTRACT

The present invention is for a method of testing a seal on a collapsible tube dispensing orifice during the manufacturing process in an assembly line. Air pressure is applied within the tube wall, at a station in the line, on one side of the seal, and the pressure is monitored on the other side of the seal within a reciprocating cover, for any increase in pressure which would indicate a leak in the seal.

1 Claim, 2 Drawing Sheets

METHOD OF TESTING A SEAL

BACKGROUND OF THE INVENTION (1) Field of the Invention This invention relates generally to a collapsible tube used to contain and dispense fluids, and particularly to a seal on the dispensing orifice of such a tube.

(2) The Prior Art Collapsible tubes are packages in tube form having a dispensing orifice at one end of a deformable tube. The tube is deformed and collapsed by squeezing so that the contents are forced out of the orifice. Such tubes are used to contain toothpaste, pharmaceuticals, cosmetics, personal care products, artists' pigments, adhesives, sealants and caulking materials, greases and lubricants, foods and condiments, and many other products. A collapsible tube generally has a screw closure cap.

Such tubes are made of metal, such as lead, tin and aluminum, or of plastic or laminate materials.

Collapsible tubes often have a seal across the dispensing orifice of the tube, particularly when used for medicinal products. The seal prevents the tube contents from leaking out prior to use. Also, the seal prevents any atmospheric contact with the tube contents, since the tube is sealed in an air-tight manner.

In use, the seal is pierced by, for instance, a point formed in the tube screw cap.

A method of forming a seal on a collapsible tube is shown in U.S. Pat. No. 4,938,818, incorporated herein by reference.

This invention is specifically directed to a method of testing such a seal for leaks.

SUMMARY OF THE PRESENT INVENTION

The present invention as seen in the drawings, provides a method of testing the seal on a collapsible tube during the manufacturing process, wherein tube components that include a head 21 with a dispensing orifice, a tube wall 22 that is secured to the head 21, a seal 35 that is applied over the dispensing orifice, and a screw closure cap 37, are all, at stations, assembled into the completed tube 118. The tube wall 22 is left open at the bottom for subsequent filling and closing.

In the present invention, in testing for a seal 35 that leaks, air under pressure is applied to one side of the seal 35, at a station 201 in the manufacturing process of the tube, and any increase in pressure on the opposite side of the seal 35 is noted.

Such pressure increase indicates a seal 35 that is defective and leaks.

DESCRIPTION OF THE PREFERRED EMBODIMENT

The Prior Art In the '818 patent referred to above, a seal disc is bonded to the dispensing orifice on the head of a collapsible tube, and the head of the tube is bonded to a preformed tube wall, by radio frequency.

After applying a closure cap to the threaded neck of the head, the open bottomed tube is ready to be shipped to a purchaser for filling through the tube open bottom, after which the tube is closed at the bottom.

The Improvement

Figure 1:
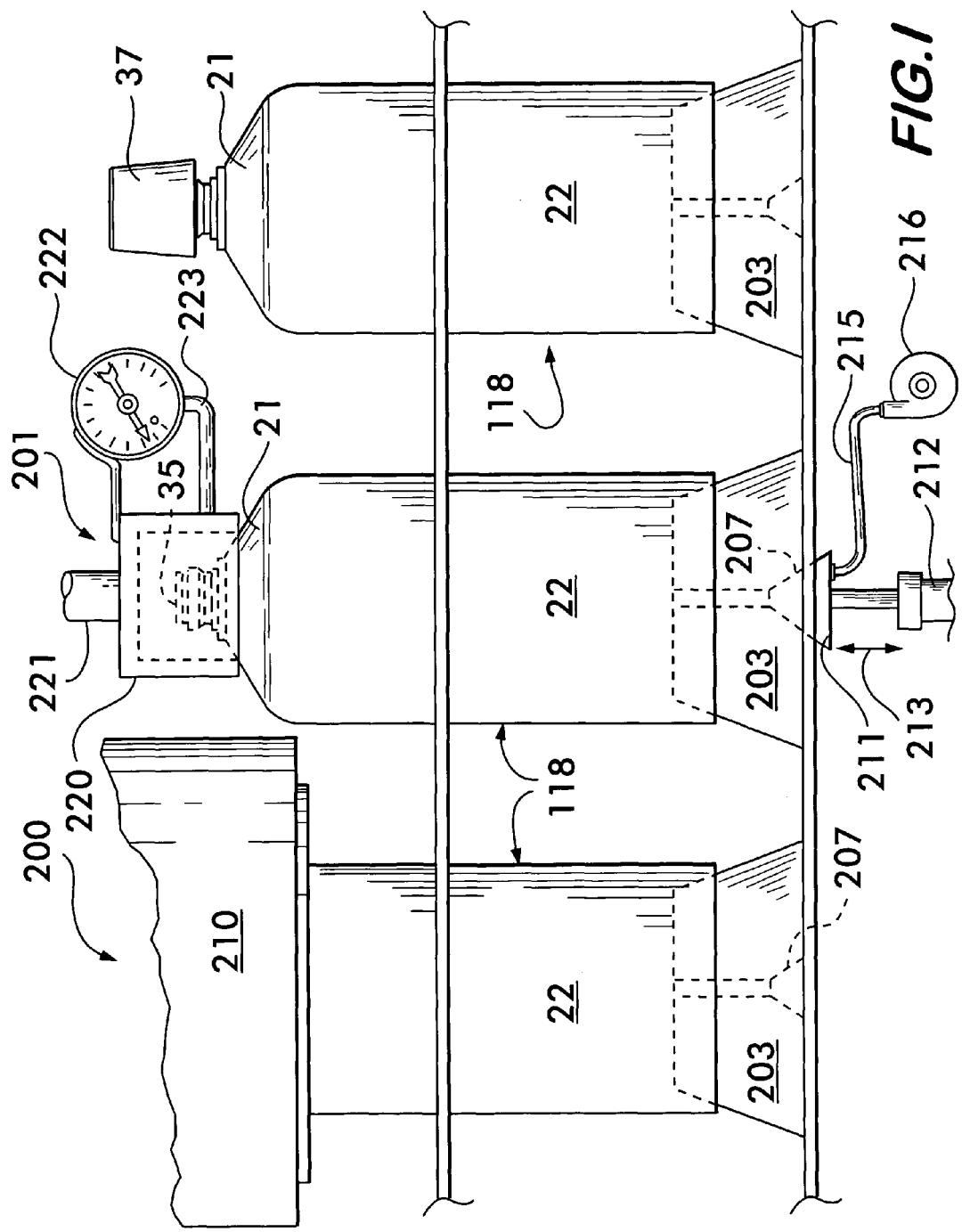
FIG. 1 is a schematic side elevational view of successive stations in the manufacturing process that includes a station 201 that tests a seal for leaks, in accordance with the present invention. The station that tests for leaks is installed between stations in the manufacture of the tube. Such stations in the manufacture of the tube are shown in FIG. 7 of the '818 patent.

In present invention, as seen in FIG. 1, a seal 35 bonded to the dispensing orifice of a head 21 of collapsible tube 118 is tested for leaks at a testing station 201, which is positioned between stations of a prior art tube manufacturing line, as disclosed in the '818 patent. The tube is formed at station 200 (designated station 90 in the '818 patent) in accordance with the disclosure of the '818 patent, where a movable, reciprocating, power-driven cap 210 bonds the seal 35 to the dispensing orifice of head 21, and tube wall 22 to the head 21, with radio frequency waves.

Cap 210 reciprocates horizontally, and tube 118, on mandrel 203 is indexed to station 201, where the testing for leaks occurs. The vacuum that has been applied at station 200, in accordance with the prior art teaching of the '818 patent, is turned off before indexing to station 201. At station 201, stopper 211 is moved upward into cavity 207 of mandrel 203 by hydraulic plunger 212, the shaft of which reciprocates vertically as shown at 213. Flexible hose 215 is connected to a regulated and valve activated compressed air pump 216 which provides air under pressure at, for instance, 40 pounds per square inch, to the interior of collapsible tube 118. The air pressure is such that the seal 35 can retain the pressure without bursting.

The stopper 211 and cavity 207 in mandrel 203 each desirably have a soft surface so they can readily form a tight force fit during the testing.

Figure 2:
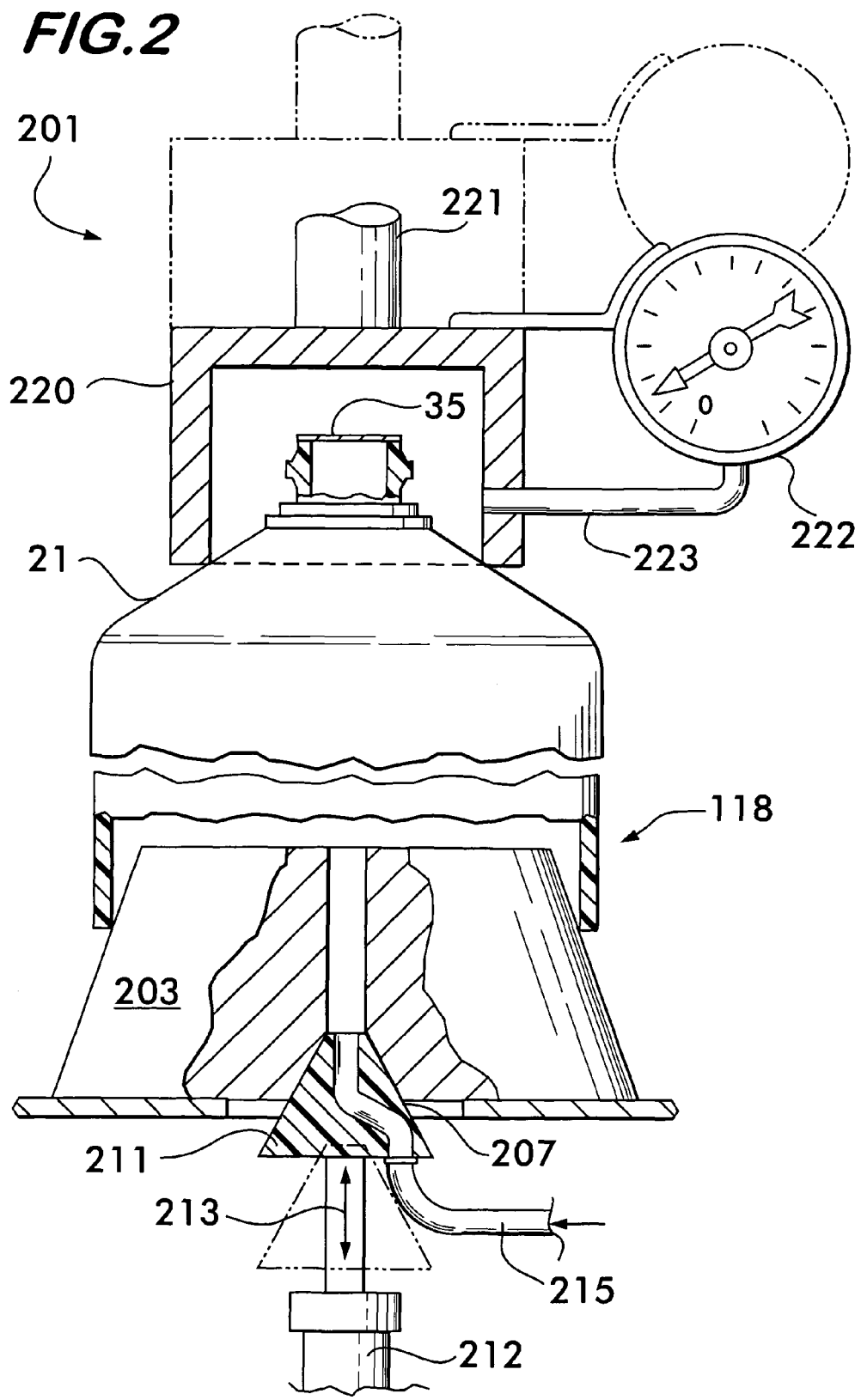
FIG. 2 is an enlarged view of the testing station of the invention shown at 201 in FIG. 1.

Simultaneously with movement of stopper 211 into position at the bottom of the tube 118 at station 201, a top cover 220, as seen at station 201 in FIGS. 1 and 2 of the present drawings, moves downward at the end of vertically reciprocating shaft 221, to cover seal 35, and to make contact with head 21. Cover 220 forms an airtight joint with head 21.

A pressure sensor 222 is supported from cover 220, with conduit 223 connected to the interior of cover 220.

In operation, during the manufacturing of the tubes 118, the tubes 118 to be tested are intermittently moved into station 201, where cover 220 is moved into contact with head 21, forming an airtight compartment over the seal 35 and head 21. Simultaneously, at station 201, stopper 211 is inserted upwardly into cavity 207 and air at a given pressure enters tube neck 30. If the seal 35 is tight with no leaks, air under pressure is maintained inside the tube 118, and no air leaks through the seal.

In the event of a leak in the seal 35, air escapes up into cover 220, and the pressure within cover 220 builds up and is detected by the pressure sensor 222. The tube 118 with the defective seal 35 is automatically removed from the assembly line to a discharge conveyor and scrapped.

Generally, there is no leakage through the seal 35, and the tube will pass to station 202, where, as in the prior art, a closure cap 32 is applied to the completed tube 118 by rotating the closure cap 32 onto the threads of the neck of head 21.

What is claimed is:

1. In the manufacture, through successive stations of an assembly line, of an empty open bottomed collapsible tube having a tube wall secured to a head, a dispensing orifice in the head, a seal on the orifice, and a closure cap applied over the orifice; the improvement comprising a method of testing the seal for leaks at a separate station in the assembly line, after the seal is applied, but before the closure cap is applied, on the orifice, by (1) temporarily closing the open bottom with a stopper,
(2) maintaining air under pressure inside the tube wall, and
(3) determining whether any air passes through the seal by monitoring the pressure on the opposite side of the seal, within a cover that forms an airtight joint with the head.

* * * * *